(12) United States Patent
Merz

(10) Patent No.: US 6,993,837 B2
(45) Date of Patent: Feb. 7, 2006

(54) METHOD FOR ASSEMBLING A CAMSHAFT

(76) Inventor: Karl Merz, Hohenweg 14, 5734 Reinach (CH)

( * ) Notice: Subject to any disclaimer, the term of this patent is extended or adjusted under 35 U.S.C. 154(b) by 49 days.

(21) Appl. No.: 10/471,484

(22) PCT Filed: Feb. 13, 2002

(86) PCT No.: PCT/CH02/00084

§ 371 (c)(1),
(2), (4) Date: Feb. 11, 2004

(87) PCT Pub. No.: WO02/072306

PCT Pub. Date: Sep. 19, 2002

(65) Prior Publication Data

US 2004/0111883 A1  Jun. 17, 2004

(30) Foreign Application Priority Data

Mar. 12, 2001  (CH) ........................... 457/01

(51) Int. Cl.
*B21D 53/84* (2006.01)
*B23P 17/00* (2006.01)

(52) U.S. Cl. ............... 29/888.1; 29/888.08; 29/6.01; 29/505

(58) Field of Classification Search ........... 29/888.1, 29/888.08, 281.1, 283.5, 6.01, 505; 123/90.16, 123/90.17, 90.6, 90.31; 74/567
See application file for complete search history.

(56) References Cited

U.S. PATENT DOCUMENTS 3,999,277 A * 12/1976 Hamada ................... 29/447
4,305,311 A * 12/1981 McGill ..................... 74/595
4,508,495 A    4/1985 Monden et al.
4,597,365 A *  7/1986 Madaffer ................ 123/90.6
4,616,389 A   10/1986 Slee
4,660,269 A *  4/1987 Suzuki ..................... 29/523
4,693,138 A *  9/1987 Hughes et al. ............ 74/567
4,783,898 A * 11/1988 Kanamaru et al. ........ 29/523
4,835,832 A *  6/1989 Arnold et al. .......... 29/888.1
4,983,797 A    1/1991 McAllister et al.
5,220,727 A *  6/1993 Hochstein .............. 29/888.1
5,380,989 A *  1/1995 Ohkubo ................. 219/667
6,286,196 B1 * 9/2001 Vogel .................... 29/421.1
2001/0025416 A1* 10/2001 Gueydan ............... 29/888.1

FOREIGN PATENT DOCUMENTS

JP   54-129249    * 10/1979   ............. 29/6.01
JP   3-185202     *  8/1991   ............ 123/90.17
WO   WO02072306 A1   9/2002

* cited by examiner

*Primary Examiner*—Marc Jimenez
(74) *Attorney, Agent, or Firm*—Tarolli, Sundheim, Covell & Tummino L.L.P.

(57) ABSTRACT

The invention relates to a method for assembling a camshaft by using a shaft (10) and a plurality of cams (21–26) comprising respectively an opening for the shaft. According to the invention, the cams are disposed in a tight manner in a storage element (40), in such a way that they are orientated towards each other in a predefined rotative position, the openings thereof for the shaft being orientated in a coaxial manner. The shaft is then introduced into the cam packet and arranged consecutively with respect to each individual cam by displacement in the longitudinal direction thereof. The cams are secured one after the other on the shaft. The required rotation of the cams can be obtained in a simple manner by longitudinal displacement of the shaft and also by optionally rotating the shaft at a certain angle.

15 Claims, 5 Drawing Sheets

METHOD FOR ASSEMBLING A CAMSHAFT

BACKGROUND OF THE INVENTION

The present invention relates to a method of assembling a camshaft using a shaft and a plurality of cams each having an opening for the shaft.

DESCRIPTION OF THE PRIOR ART

A method of this type is disclosed by U.S. Pat. No. 4,983,797, the shaft in this case being firmly clamped and the cams being individually drawn in succession from a magazine by means of a first robot, pushed onto the shaft and each held on the shaft in the correct longitudinal and rotative position. The cams thus located and held in position are then welded to the shaft by means of a laser welding head fixed to the arm of a second robot.

SUMMARY OF THE INVENTION

The invention as characterized in the patent claims proposes another method of assembly. This is characterized in that the cams, tightly packed in a magazine, are oriented with their openings for the shaft coaxial and in a defined rotative position in relation to one another, that the shaft is introduced into the cam stack where it is successively oriented in relation to individual cams by displacement in its longitudinal direction, and that the cams are successively secured on the shaft.

Among other things, the method according to the invention has the advantage over the prior art that it can be executed very precisely using substantially simpler mechanical means. There is no need for an assembly robot capable of moving about multiple axes.

In order to bring the cams into their correct rotative position, the shaft is preferably, where necessary, simply rotated through a defined angle before securing the respective cam.

The rotative position of the cams can most easily be checked if the cams contained in the magazine are all in the same rotative position in relation to one another. This also greatly simplifies the design and filling of the magazine.

According to a further preferred embodiment of the invention the cams are only pre-secured on the shaft, the cams only later being finally joined to the shaft, more preferably even in another machining station.

The cams can be pre-secured simply through an inherent pre-stressing of the parts, by crimping, by adhesive bonding or by welding, in the latter case in particular by spot-welding.

According to another preferred embodiment of the invention the cams, after pre-securing, are finally joined to the shaft by welding, in particular by laser or electron-beam welding.

In order to reduce stressing of the parts during welding, and to avoid bending of the shaft, the shaft and the cams may be preheated before welding the cams to the shaft. According to a further especially preferred embodiment of the invention, the heating is brought about by electric power loss and an electrical current is fed through the shaft for this purpose.

Where cams are used that are made, at least in some areas, of a steel hardened to a first hardness, the heating may be performed so that the cams are tempered to a hardness lower than the first hardness. This also then makes them easier to weld.

As already mentioned, pre-securing of the cams on the shaft and final welding of the cams to the shaft and any heating of the shaft provided with the pre-secured cams prior to welding may in each case be performed in separate machining stations, so that these operations can efficiently be undertaken on different camshafts simultaneously.

Further developments and features of the invention are set forth in the following description of examples of embodiments.

DESCRIPTION OF THE PREFERRED EMBODIMENTS

Figure 1:
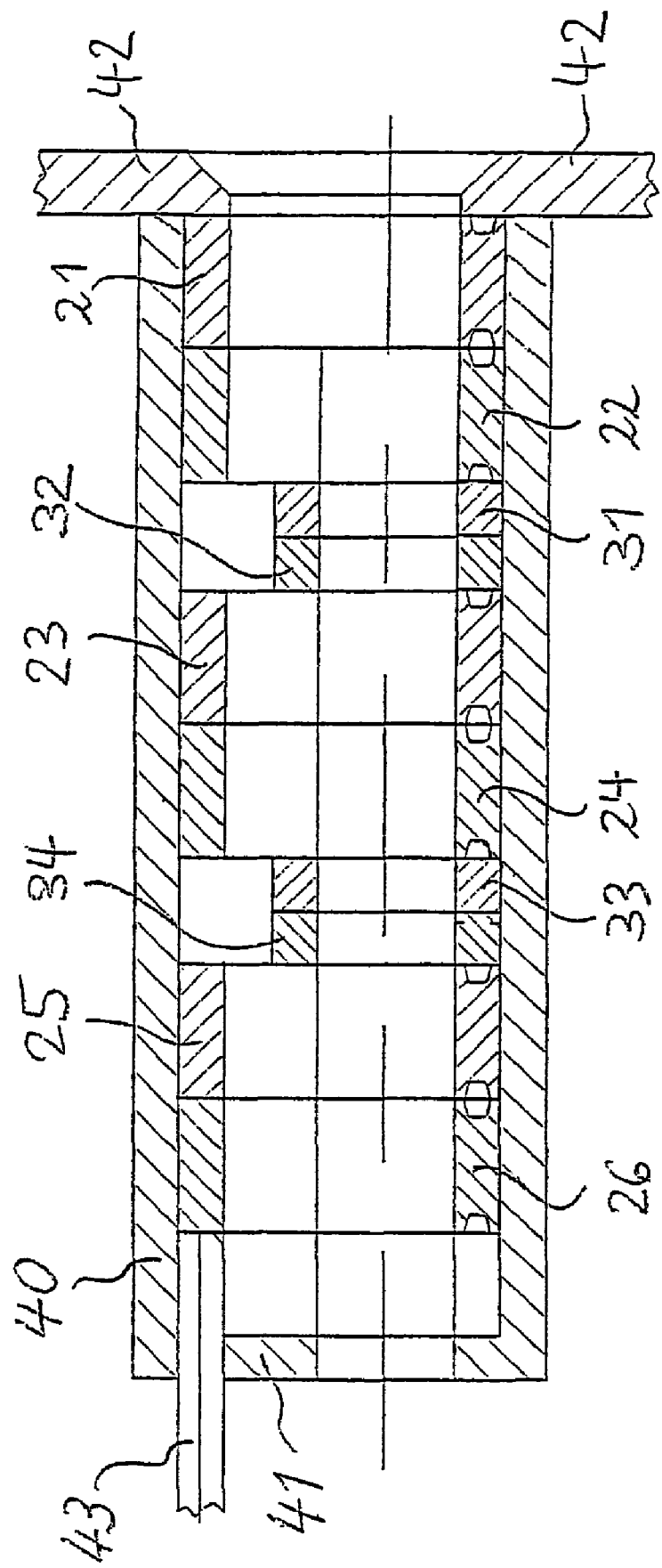
FIG. 1 shows a longitudinal section through a magazine with a plurality of cams.

In FIG. 1, 40 denotes a magazine loaded with six cams 21–26 and with four bearing rings 31–34. The cams 22–26 and the bearing rings 31–34 are tightly packed in the magazine 40 and oriented coaxially with one another. The cams in the magazine 40 are furthermore preferably all situated in the same rotative position, relative to one another, defined by the shape of the magazine 40. The magazine 40 has a rear end wall 41 with an insertion opening for a shaft 10 (see FIG. 2). On its right-hand side there are adjustable fasteners 42, so that it can be filled with the cams 20 and the bearing rings 30 from this side. A push bolt 43 presses the cams and the bearing rings to the right and holds them in a defined position against the closures 42. The closures 42 and the push bolt 43 need not necessarily be part of the magazine.

Figure 2:
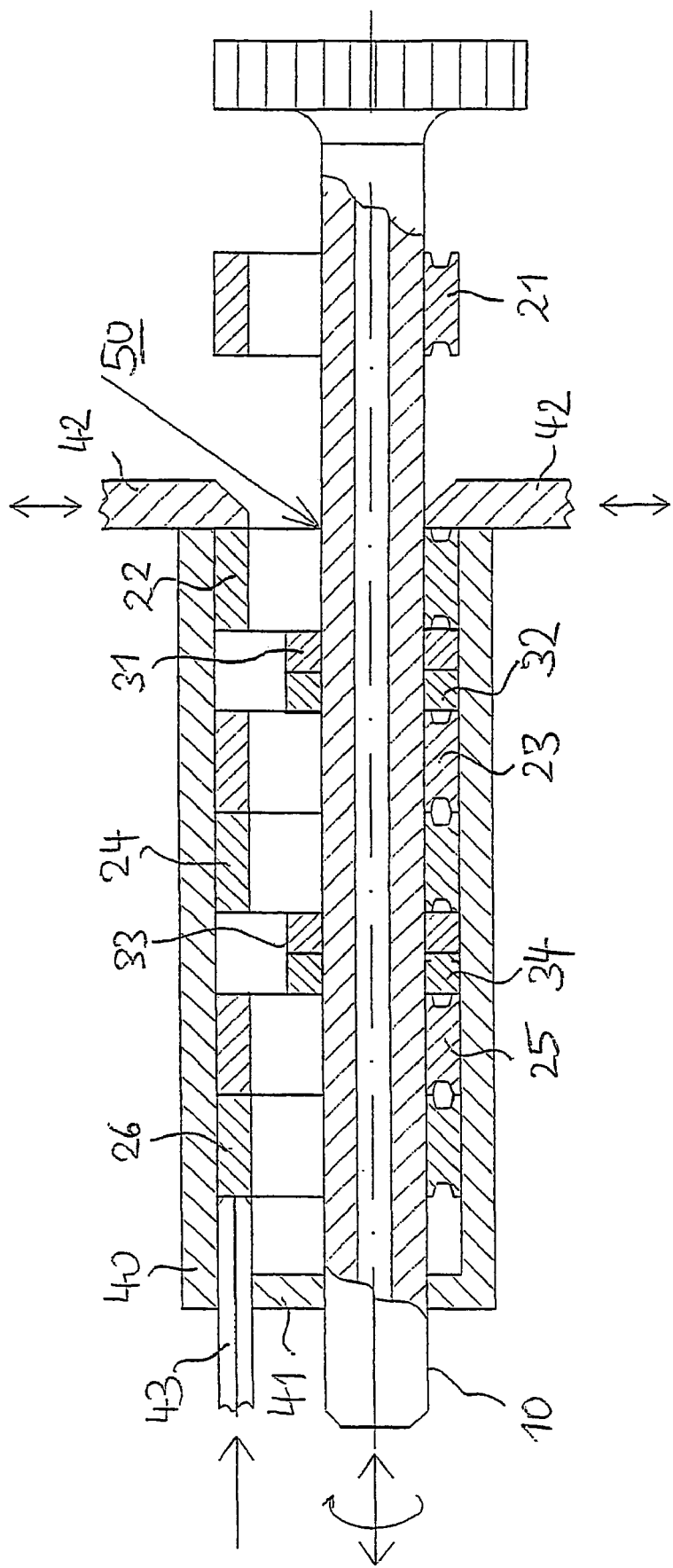
FIG. 2 shows the magazine in FIG. 1 with a shaft inserted therein through the stack of cams.

In FIG. 2, a shaft 10 is inserted into the magazine 40 and through the stack composed of the cams 21–26 and the bearing rings 31–34. It will be assumed here that the magazine is held immobile by corresponding holders and the shaft is accommodated in a type of spindle, for example, and is displaceable in its longitudinal direction and rotatable about its longitudinal axis by means of said spindle. The corresponding holders are not represented in the drawing. Devices by means of which the cams 21–26 and also any bearing rings 3–34 can be secured or at least pre-secured on the shaft are likewise merely indicated by the arrow 50. These devices 50 may take the form of a laser, for example, by means of which it is possible, in particular, to spot-weld the cams to the shaft.

With the device described the cams 21–26 (no further consideration will be given here to the bearing rings 31–36)

can be successively secured, starting at cam 21, on the shaft in the order in which they are contained in the magazine, the cam being secured in each instance being that cam situated fully to the right in the magazine up against the fasteners 42. The correct position and rotative position of the shaft 10 in relation to this said cam is in each instance adjusted by longitudinal displacement and where necessary rotation of the shaft.

After securing each individual cam the fasteners 42 are briefly opened in order that a longitudinal section of the shaft together with the cam secured thereon can be drawn out of the magazine. The following cam in the magazine is secured as soon as it in turn has been pushed up against the fasteners by the push bolt 43 and the shaft adjusted by longitudinal displacement and any rotation necessary.

FIG. 2 shows the shaft 10 with a cam 21 already secured thereon and drawn out of the magazine 40, at the instant when the cam 22 is being secured by the devices 50. As soon as all parts contained in the magazine have been used up, the shaft can be withdrawn entirely from the magazine.

Where the securing process, as is preferred, merely involves pre-securing, the cams still have to be finally joined to the shaft. According to a development of the invention this is done in a separate process, by laser welding, for example. In this case it is advantageous to provide the cams with a slot in the front face, forming a type of skirt through which, with the laser at an oblique angle, durable welding with a virtually optimum weld cross-section is possible.

Figure 3:
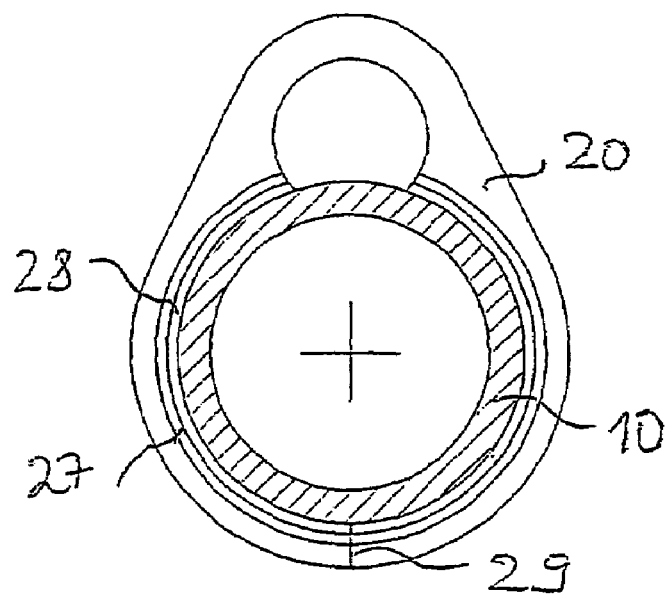
FIG. 3 shows a front view of an individual cam on the shaft, FIG. 4.*a* shows under a) an enlarged representation, again in a longitudinal section, of an individual cam pre-secured on the shaft by shrinking on and finally secured by laser welding, FIG. 4.*b* shows a similar representation of an individual cam pre-secured on the shaft by shrinking on, FIG. 5 shows a shaft with a plurality of cams secured thereon, which for the purposes of pre-heating is connected at each end to the poles of a current source, and FIG. 6 in diagrammatic form shows the sequence in a method of assembly comprising the stages: (i) pre-securing of the cams on the shaft, (ii) preheating of the shaft and the cams and (iii) final welding of the cams to the shaft.
Figure 4A:
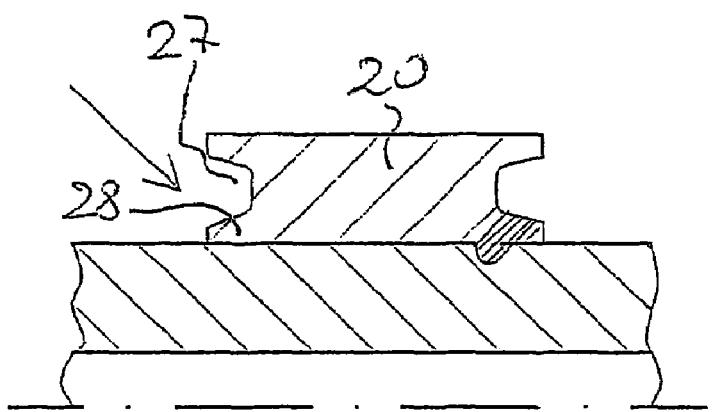

FIG. 3 shows a front view of a cam 20 provided with such a slot 27 on a cut shaft 10. FIG. 4a) shows a longitudinal section through an enlarged section of this cam 20, in which the slot 27 together with the resulting skirt 28 can be seen particularly clearly in the left-hand part of the figure. The resulting weld cross-section is shown in the right-hand part of the figure.

Figure 4B:
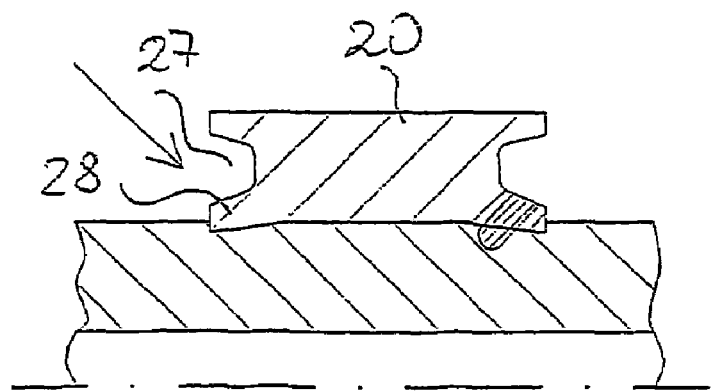

When using such cams, they can also be pre-secured by crimping, as is shown (heavily exaggerated) in FIG. 4b), instead of said spot-welding. In this case, by exerting a force, the skirt 28 is impressed into the surface of the shaft 10 using a suitable tool, thereby producing a certain positive interlock between the cam 20 and the shaft 10. This method of pre-securing has the advantage that it eliminates any clearance between the cam and the shaft which is disadvantageous to the welding. The weld cross-section is again shown in the right-hand part of FIG. 4b).

Adhesive bonding may also be generally mentioned as a further possible method of pre-securing. A small adhesive bonding spot on the circumference of the cam may be sufficient in this case. Even the inherent pre-stressing of the parts, forming a press fit, may possibly be sufficient for satisfactory pre-securing.

It should also be mentioned with regard to the cam 20 in FIG. 3 that this may be made from a sheet metal strip bent together and welded together at 29, in particular by resistance welding. By specially structuring the inside of the strip, the cam 20 can be made to enclose the shaft tightly over a larger angular range, as is also shown in FIG. 3.

Comparatively hard, highly carburized steels are commonly used for the manufacture of camshafts of the type here under consideration. Such steels are not readily welded. In this respect it is advantageous to preheat the parts to be welded together. According to a further embodiment of the invention, the shaft provided with the pre-secured cams can easily be preheated by passing a current through the shaft. In this case heating occurs due to the resistance losses of the current. It has been shown that with a voltage of less than 20 V, and in particular of even just 5 V, and a current ranging from 5 to 12 kA it is possible to achieve a very uniform heating of the shaft and the cams in just a few seconds.

Figure 5:
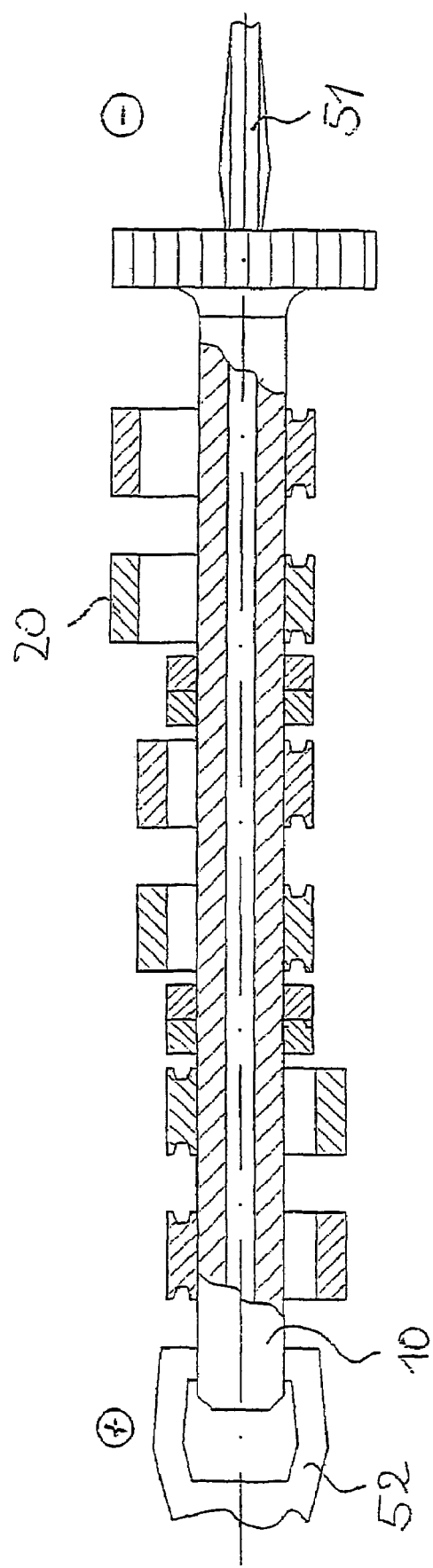

FIG. 5 shows a shaft 10 with cams 20 pre-secured thereon, both ends of which are connected to the poles 51 and 52 of a source of electrical current.

The rolling surfaces of the cams are usually also specially hardened, by induction hardening, for example. A typical hardness after quenching is, for example, 60–70 $HR_C$. The electrical heating described may to further advantage be performed so as to result in tempering of the cams (e.g. to a hardness of 57–59 $HR_C$). This obviates the need for any prior annealing of the cams in a separate operation. In order to obtain this effect, temperatures in the range between 200–300° C. should be reached.

Figure 6:
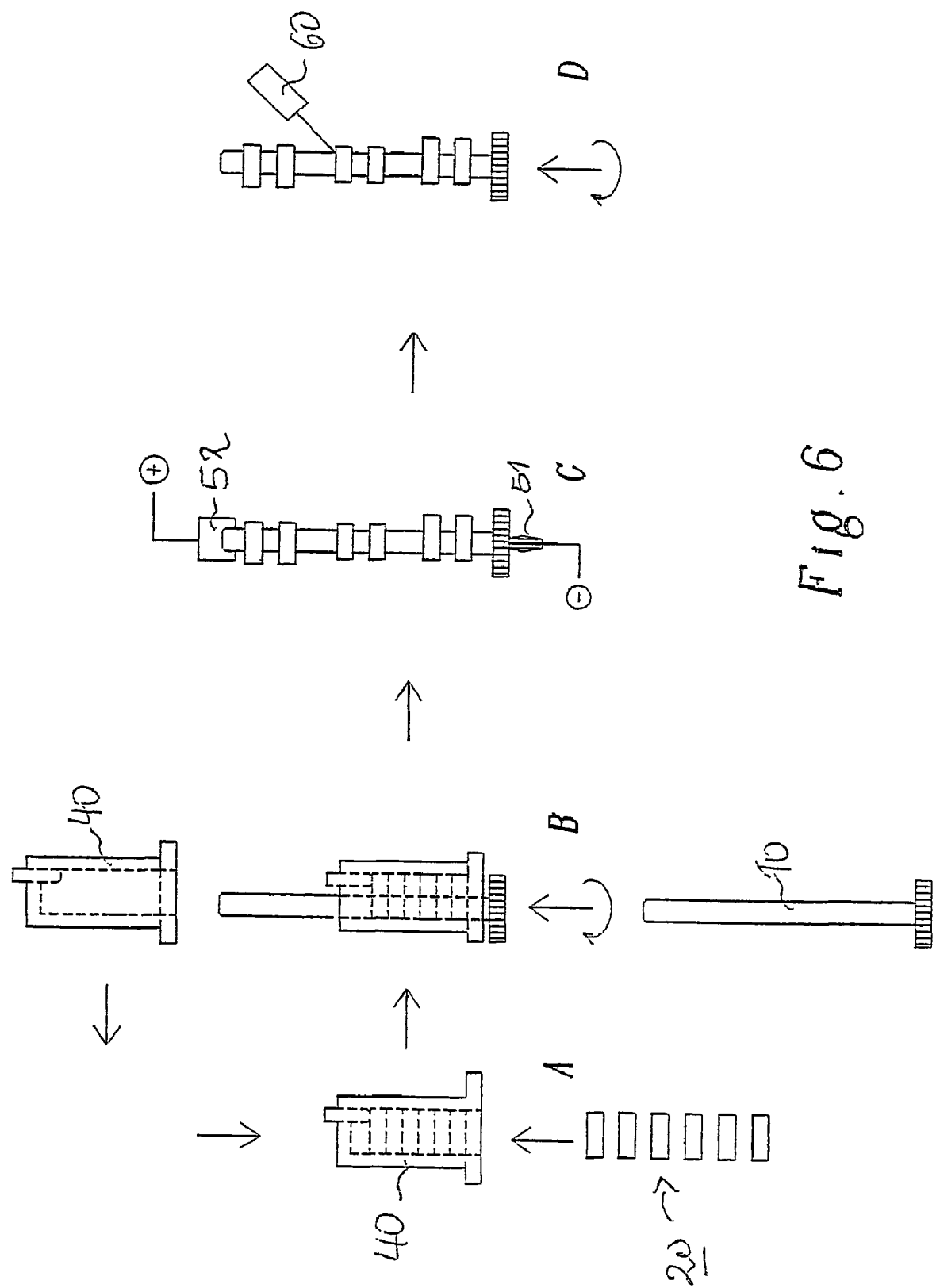

FIG. 6 finally shows a diagram of the sequence in a method of assembly in which the techniques previously described are efficiently used to optimum effect. The pre-securing of the cams 20 on the shaft 10, the welding of the cams to the shaft and also the heating of the shaft provided with the pre-secured cams prior to welding are here in each case performed in separate machining stations. Said operations can therefore advantageously be performed on different camshafts simultaneously.

In station A in FIG. 6 empty magazines 40 are first filled with individual cams 20 (and any bearing rings 30). In station B shafts 10 are each introduced into the magazine 40. There the cams 20 are pre-secured on the shafts 10. From station B the empty magazines 40 are transported back to station A and the shafts 10 pre-assembled with the cams 20 are transferred to station C, where they are electrically pre-heated. From there they pass while still hot to station D, where the cams 20 are, for example, successively each finally welded to the shaft 10 by a laser 60 as the shaft is rotated.

Multiple lasers could obviously also be used simultaneously in station D. Buffer zones in each of which multiple shafts temporarily await further machining or in which quality control measurements are performed, could also be instituted between the individual machining stations. Finally, the shafts could also be subjected to a current in station D, in order to make up for any temperature losses between the individual welding operations. It would likewise be possible to combine stations C and D into one station.

What is claimed is:

1. A method of assembling a camshaft, said method comprising the steps of:
   providing a shaft (10) and a plurality of cams (20≧26), each cam (20–26) having an opening for the shaft (10);
   packing the cams (20–26) in a magazine (40), each cam (20–26) being oriented such that the openings for the shaft (10) are coaxial thereby defining a cam stack;
   inserting, subsequent to said packing step, the shaft (10) into the cam stack longitudinally through the openings of the cams (20–26);
   successively securing the cams (20–26) to the shaft (10) by the following steps (a), (b), and (c); (a) securing a first cam (20) to the shaft (10);
   (b) after securing the first cam (20) to the shaft (10), axially and longitudinally moving the shaft (20) relative to the cam stack through an opening in at least a second cam (21) such that the first cam (20) moves axially away from the second cam (21); and
   (c) after the first cam (20) moves axially away from the second cam (21), securing the second cam (21) to the shaft (10).

2. The method as set forth in claim 1 further including the step of rotating the shaft (10) through a defined angle relative to the cams.

3. The method as set forth in claim 1 wherein the cams (20–26) contained in the magazine (40) are in the same rotative position in relation to one another.

4. The method as set forth in claim 1 further including the steps of:
pre-securing the cams (20–26) to the shaft (10); and
joining the cams (20–26), subsequent to said pre-securing step, to the shaft (10).

5. The method as set forth in claim 4 wherein said pre-securing step is performed by crimping.

6. The method as set forth in claim 4 wherein said joining step includes laser welding the cams (20–26) to the shaft (10).

7. The method as set forth claim 6 further including the step of preheating the cams (20–26) prior to said joining step.

8. The method as set forth in claim 7 wherein said preheating step includes heating by electric power loss and feeding electrical current through the shaft (10).

9. The method as set forth in claim 7 characterized in that the cams (20–26) are made at least partially of steel hardened to a first hardness and that said preheating step includes tempering the cams (20–26) to a hardness lower than the first hardness.

10. The method as set forth in claim 7, characterized in that said pre-securing step and said joining step are performed in separate machining stations in such a way that said pre-securing step and said joining step can be undertaken on different camshafts simultaneously.

11. The method as set forth in claim 4 wherein said pre-securing step includes spot-welding.

12. The method as set forth in claim 4 wherein said joining step includes electron-beam welding.

13. The method as set forth in claim 4 wherein said pre-securing step is performed by adhesive bonding.

14. The method as set forth in claim 1 wherein the final position of each of the cams (20–26) on the shaft (10) is reached by longitudinally moving and rotating the shaft (10) within the cam stack.

15. The method as set forth in claim 1 wherein tips of the cams (20–26) in the cam stack are situated in the same angular position relative to each other before insertion of the shaft (10).

* * * * *

UNITED STATES PATENT AND TRADEMARK OFFICE
CERTIFICATE OF CORRECTION

PATENT NO. : 6,993,837 B2  Page 1 of 1
APPLICATION NO. : 10/471484
DATED : February 7, 2006
INVENTOR(S) : Karl Merz It is certified that error appears in the above-identified patent and that said Letters Patent is hereby corrected as shown below:

Column 4, line 49 after "cams" change "(20≥26)" to --(20-26)--.

Signed and Sealed this

Eighteenth Day of July, 2006

JON W. DUDAS
*Director of the United States Patent and Trademark Office*